(12) United States Patent
Artus

(10) Patent No.: US 8,731,766 B2
(45) Date of Patent: May 20, 2014

(54) PROCESS FOR UPDATING THE SCHEDULING OF A SERVICE STOP FOR A MACHINE

(75) Inventor: Samuel Artus, Dolomieu (FR)

(73) Assignee: Renault Trucks, St. Priest (FR)

( * ) Notice: Subject to any disclaimer, the term of this patent is extended or adjusted under 35 U.S.C. 154(b) by 409 days.

(21) Appl. No.: 12/747,907

(22) PCT Filed: Dec. 21, 2007

(86) PCT No.: PCT/IB2007/004423
§ 371 (c)(1),
(2), (4) Date: Jun. 12, 2010

(87) PCT Pub. No.: WO2009/081229
PCT Pub. Date: Jul. 2, 2009

(65) Prior Publication Data
US 2010/0280702 A1 Nov. 4, 2010

(51) Int. Cl.
*G01M 17/00* (2006.01)
*G06F 7/00* (2006.01)
*G06F 19/00* (2011.01)
*G06F 11/30* (2006.01)
*G07C 5/00* (2006.01)

(52) U.S. Cl.
USPC ....... 701/29.4; 701/29.1; 701/32.7; 701/34.4; 701/32.1; 702/182; 702/183; 702/184

(58) Field of Classification Search
USPC ........ 701/23, 25, 29.1, 29.3, 29.4, 31.4, 34.3, 701/34.4, 117, 422, 423, 424, 465; 705/7.12, 7.13, 7.25, 7.26, 7.37, 7.38, 705/305; 702/182, 183, 184
See application file for complete search history.

(56) References Cited

U.S. PATENT DOCUMENTS

| | | | |
|---|---|---|---|
| 4,525,782 A * | 6/1985 | Wohlfarth et al. | 701/99 |
| 7,706,938 B2 * | 4/2010 | Palladino | 701/29.4 |
| 2004/0073468 A1 | 4/2004 | Vyas | |
| 2005/0080525 A1 * | 4/2005 | Hoeflacher et al. | 701/29 |

FOREIGN PATENT DOCUMENTS

| | | |
|---|---|---|
| EP | 1691326 A | 8/2006 |
| WO | 2007005002 A | 1/2007 |

OTHER PUBLICATIONS

International Search Report for corresponding International Application PCT/IB2007/004423.

* cited by examiner

*Primary Examiner* — Rami Khatib
(74) *Attorney, Agent, or Firm* — WRB-IP LLP

(57) ABSTRACT

A process for updating the scheduling of a service stop for a machine includes determining, for at least one service operation, a service occurrence specification, monitoring the machine's usage severity, and setting an earliest occurrence point and a latest occurrence point for the service occurrence specification which are determined according to the machine usage severity monitored during a monitoring interval.

19 Claims, 3 Drawing Sheets

PROCESS FOR UPDATING THE SCHEDULING OF A SERVICE STOP FOR A MACHINE

BACKGROUND AND SUMMARY

The invention relates to a process for scheduling a service stop for a machine. It may be applied especially within the fields of vehicles, vehicle subassemblies such as vehicle engines, construction equipment machines, and industrial engines in general.

Up to date, vehicle service is most often performed according to a preventive process. From its first date of operation a vehicle is supposed to be serviced at regular intervals which are predefined by the vehicle manufacturer. Usually, those intervals are defined in terms of a certain distance which the vehicle can travel between two planned service stops, and sometimes in terms of a maximum time interval between such two stops. The intervals could also be defined as a function of operating time of the vehicle or of one of its sub-parts, such as the engine operating hours. At each of these planned service stops, the service team is supposed to replace, to readjust or at least to check a list of vehicle components. The list of components is established according to a predefined service interval specification for each service operation. Of course, such a predefined service scheduling is devised so that service operations are grouped to be performed at common service stops to minimize the numbers of stops for the vehicle.

One problem of this method is that it does not take into account what has really happened in the lifetime of the vehicle. Indeed, in reality, the vehicle may have experienced breakdowns necessitating the premature performance of one or several service operations. To the contrary, some of the planned service operations may have been delayed, for good or bad reasons, compared to their timing in the predefined service scheduling. In both cases, it becomes necessary to deviate from that predefined service scheduling to still comply with the predefined service interval specifications for those operations which have been performed out of the predefined schedule. When such deviations concern only a very limited number of service operations, it is possible to handle this quite easily, but when the number of such deviations rise, which is inevitable when the vehicle ages or when the vehicle is complex and has a very comprehensive preventive service scheduling, those deviations become very complex to handle properly. A usual consequence is then to perform certain service operations too early, which leads to an added cost, or too late, which will increase the risk of vehicle malfunction. In order to minimize those two consequences, it is then necessary to provide additional stops between the predefined service stops. This has of course the downside of reducing the vehicle uptime, which is the time where the vehicle is fully available to perform the operation it is designed for.

In document US2005/0080525, it is disclosed an improved process for determining the time and extent of service operations. According to this process, the service scheduling is constantly updated and can therefore take into account the vehicle's history in terms of service operation. The process described in that document monitors a series of components for which a service interval is specified. Those service intervals are specified with an ending window having a minimum and a maximum end point. When a service stop is to be performed, the process monitors what are the service operations for which the ending window will occur within a time frame. That time frame is defined as starting when the earliest maximum end point will be reached for the set of monitored service operations. The process also provides for setting a minimal interval between the next stop and a subsequent stop in order to determine which service operations are to be performed within the next service stop or within the subsequent stop. This process has therefore the advantage of updating an initial service scheduling, allowing to take into account the history of unplanned service operations previously performed on a given vehicle.

Nevertheless, there is still room for improving the way service scheduling can be updated, in view of minimizing the risk of vehicle malfunction without performing unnecessary preventive service operations.

According to an aspect of the present invention a process is provided for updating the scheduling of a service stop for a machine, comprising the step of determining, for at least one service operation, a service occurrence specification, characterized in that it comprises the step of monitoring the machine's usage severity and in that it comprises the step of setting an earliest occurrence point and a latest occurrence point for the service occurrence specification which are determined according to the machine usage severity monitored during a monitoring interval.

In an aspect of the invention, the occurrence specification can be the end of a service interval specification.

DETAILED DESCRIPTION

Figure 1:
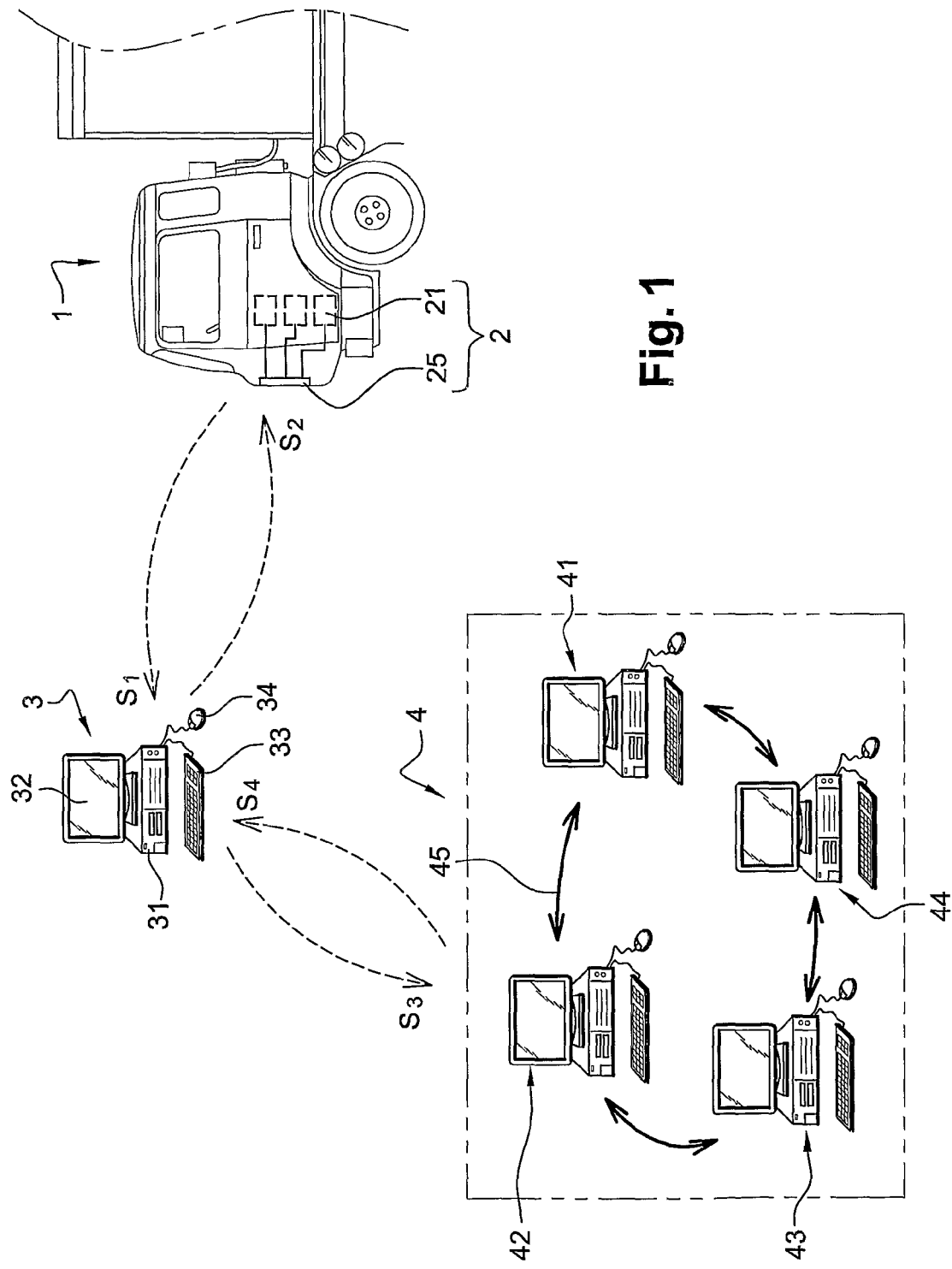
FIG. 1 is a schematic representation of one embodiment of a system in which the invention can be implemented.

The invention relates to a process for updating a service scheduling for a machine. It will be hereinafter described in relation to the field of vehicle service scheduling, more particularly in the context of commercial truck servicing. Such process will preferably be automated and performed through a computer system and will be iterative. The process will preferably be part of a more global service scheduling process. The process according to the invention will preferably be carried out by a system for scheduling service stops for a vehicle, comprising at least monitoring means on-board of the vehicle for monitoring at least one vehicle parameter, and scheduling means off-board the vehicle for scheduling service stop. Preferably, the system will also comprise communication means between the on-board monitoring means and the off-board scheduling means for automatically retrieving information from the vehicle monitoring means to the scheduling means from time to time, and possibly for sending to the vehicle information relative to a next service stop. Such systems are well known to the man in the art such as the commercially available Renault Trucks Infomax systems or Volvo Dynafleet systems for commercial trucks and will not be described any further.

One prerequisite for the updating process will be to have so-called previous service scheduling comprising at least a list of service operations to be performed on the vehicle and at least the specified occurrence at which each of these service operations shall be performed next. Each of these specified occurrences can be expressed in various ways. For most vehicle components, it is expressed in terms of traveled distance by the vehicle, but for some components, it is expressed in terms of absolute time. It could also be expressed in terms of engine operating hours. The previous service scheduling can be an initial service scheduling for the vehicle, in which case it can be very similar to the already known service scheduling having a fixed determined occurrence for each service operation. The previous/initial service scheduling can also have at least some service operations for which the occurrence is specified as a window having an earliest occurrence point and a latest occurrence point. The scheduling process being suited for iterative operation, the previous service scheduling can of course result also from a previous updating process according to the invention. Examples of service occurrence specification can therefore be as such service operation (part to be replaced, parameter to be monitored, etc.) should occur at that date, or between an earliest date and a latest date.

service operation should occur at that mileage, or between that earliest mileage and that latest mileage.

In many cases, the service occurrence specification will be defined as the end point of a service interval specification having a specified duration and a specified starting point. In such cases, the occurrence specification may therefore be defined as being within a window between the minimum and the maximum end points of a service interval specification for which a starting point has been determined. In such cases, the service occurrence specification can result from the definition of specified service interval, such as:

service operation should occur no later than x months since previous same service operation; or since vehicle first use; or service operation should occur between that mileage and that mileage since previous occurrence of the same service operation; or since occurrence of other defined triggering event.

According to one aspect of the invention, the updating process comprises the step of determining an earliest occurrence point and a latest occurrence point for the service occurrence specification. The earliest and latest occurrence point define an occurrence window and can be determined either directly in the process, or they can be inferred by the determination of the position (in time, in distance, etc . . . ) of one point of the window (starting point, end point, mean point, etc . . . ) and of the width of said window.

According to one aspect of the invention, the occurrence window for at least one service operation is determined according to the vehicle usage's severity. Therefore, the invention involves monitoring the vehicle's usage severity.

The underlying idea is that many service operations on a vehicle should be in reality either delayed or performed earlier depending on how the vehicle is used. Usage severity can be determined in many ways, and could be determined in different ways when relating to different service operations affecting different vehicle components. Indeed, a first vehicle operating set of conditions can be considered more severe than a second vehicle operating set of conditions for one vehicle component, but less severe than the same second set of operating conditions for a second vehicle component.

In an embodiment of the invention, the vehicle's usage severity shall be monitored through the monitoring of at least one vehicle parameter during a monitoring interval. Preferably, the monitoring interval will be substantially continuous with respect to the vehicle's operation, but the monitoring interval could be discontinuous, with gaps. For example, the monitoring interval can disregard all moments when the vehicle's engine is stopped and all moments when the vehicle is idling. The monitoring interval would then include only those moments when the vehicle engine is running and when the vehicle speed is not zero.

The monitoring interval has a starting point. The starting point can be directly linked to the specific service operation for which the occurrence will be affected by the usage severity defined through this parameter. For example the monitoring interval starting point can be the last occurrence of the said service operations, or of a related service operation. If the said service operation involves only checking a given part, the starting point can be the last occurrence of related service operation where that part has been replaced. The starting point of the monitoring interval can be fixed, for example corresponding the vehicle's first use. The starting point can also be determined as being a fixed distance or time to present, determining then a fixed width sliding monitoring interval (last X kilometers, last Y days). For example, the monitoring interval can comprise a sliding one year period of time.

During that interval, the monitoring can be continuous or discrete. In other words, the vehicle parameter(s) can be monitored all the time (for example every second or more often) or from time to time. This should preferably be determined according to the rate of change of the parameter over time/distance. For example, if the vehicle parameter which is monitored is engine speed, it would seem preferable to have measurements at least every second, while if the vehicle parameter is engine oil temperature, a measurement every five minutes should be sufficient. Also, when, during the monitoring interval, only discrete values of the parameter are monitored, those values can be either discrete instantaneous values or discrete mean values for an interval between two discrete values of said parameter. In one embodiment, the discrete value of the parameter which will be used can be the mean value of the parameter since the last update process, or, especially in cases where the service scheduling process is carried out by a system which is not on-board the vehicle, since the last time vehicle information has been transmitted to the service scheduling system.

Also, while for a given service operation, one parameter may be a sufficiently good indication of the vehicle usage severity, it may be preferable, at least for some service operations, to monitor several vehicle parameters and to combine these parameters in order to obtain a better image of the vehicle's usage severity in relation to those operations.

According to a preferred embodiment of the invention, the parameter or parameters which are to be monitored for determining the vehicle usage severity differ from parameters indicating the state of health of a vehicle component. Indeed, it is known for example to directly determine the state of health of an electric battery. It is also known to measure, in situ, the remaining thickness of a brake pad lining. From those parameters, it is of course very easy to determine when the corresponding vehicle component should be serviced. If available, such parameters could indeed be used within the framework of a service scheduling process incorporating the updating process according to the invention, but the said updating process is particularly directed to service operations for which no direct state of health parameter is easily available.

Thanks to the choice of a good usage severity indicator, it will be possible to use the same indicator for all the service operations, or at least a substantial number of service operations, so that there will be only one parameter or a limited number of parameters to monitor, whatever the number of service operations are encompassed within the service scheduling process.

A good usage severity indicator will not, contrary to the above mentioned component wear indicating parameters, vary linearly with time/distance, and will not be ever increasing or constant over time/distance, and will not be ever decreasing or constant over time/distance. To the contrary, a good usage severity indicator will alternatively increase or decrease, or remain constant over time and distance, except of course in very specific and unusual usage patterns.

Very simple usage severity indicators could be energy consumption (for example fuel consumption and/or electric consumption), engine oil temperature, vehicle speed, vehicle engine speed, vehicle total weight, use of brakes, number of cranking operations, number of transport cycles, weather parameters, etc . . . , or any combination thereof. These parameters have the advantage of being easily measurable and already available on most vehicles.

In one embodiment of the invention, vehicle fuel consumption rate, expressed in amount of fuel consumed per traveled distance, can be used as the parameter to be monitored. The vehicle consumption rate results in fact from a calculation based on the monitoring of the amount of fuel consumed and on the monitoring of the traveled distance. The ratio can be calculated on-board the vehicle or off-board in the scheduling means. The fuel consumption rate can be calculated for each operating day of the vehicle as the day's mean fuel consumption rate. It can be preferred than the fuel consumption rate is calculated after having deducted the amount of fuel consumed while the vehicle is not traveling, e.g. when the vehicle is idling. The daily mean fuel consumption rate can be then either communicated to the scheduling means, if at least daily communications are provided between the on-board system and the off-board system, or it can be stored on-board the vehicle until the next communication session. Another possibility is to calculate the mean fuel consumption rate since the last communication session where vehicle information has been transferred from the on-board monitoring means to off-bard scheduling means.

In both cases the scheduling means will be able to store the information relating to the fuel consumption rate and to the corresponding day(s) to which the fuel consumption rate corresponds. Preferably, the system will be able to store the information for a one year sliding period.

The system will then be able to process these parameter values to transform them, if necessary, in terms of usage severity. Indeed, according to the invention, the process for updating the service scheduling comprises the step of setting an earliest occurrence point and a latest occurrence point for the service occurrence specification, and the earliest and latest points are determined according to the vehicle usage severity monitored during a monitoring interval.

To that effect, it would be possible to simply define the earliest and latest points by taking into account a mean usage severity during the monitoring interval. This could be in the form of determining a mean usage severity value (for example through a mathematical formula based on the retrieved parameter values), and using that value as a multiplying factor (lower or grater than 1) applied to standard earliest and latest points for a given service operation.

According to a preferred embodiment of the invention, the step of setting the earliest and latest occurrence points takes into account the distribution of usage severity during the monitoring interval.

To that effect, in one embodiment of the invention, usage severity will be defined using a series of severity classes E1, E2, . . . Ej. Each class Ej is defined by a range of fuel consumption rates. For each value of the mean fuel consumption rate retrieved from the vehicle, it is therefore possible to classify the corresponding operating period within one usage severity class.

For example, the usage severity classes can defined as follows.

| Fuel consumption rate (1/100 km) | <20 | 20-25 | 26-30 | >30 |
|---|---|---|---|---|
| Usage severity class | E1 | E2 | E3 | E4 |

From there, a distribution of usage severity during the monitoring interval can be obtained by counting, for each severity class, a proportional frequency of presence (for example expressed in percentage of monitoring interval or as a ratio of the monitoring interval) of said parameter within each severity class. If we take the assumption that monitoring of the parameter is done on a daily basis during the monitoring interval, the proportional frequency of presence f(Ej) in one severity class Ej can be defined as being the number of days NB(j) for which the usage parameter has been within the range of said class Ej, out of the total number of days TNB of the monitoring period for which a severity class has been attributed.

One embodiment of the inventive process can be as follows. In the following example, the service occurrence specification for a specific service operation will be determined as the end point of a service interval specification, which is a recommended time/distance/operating interval for performing the service operation. The starting point of the interval can be the last time the same operation has been performed.

The scheduling process according to the invention will then need to be able to tie the service occurrence specification to the usage severity. Although it is possible, at least in some cases, to have some kind of mathematical formula directly linking the occurrence specifications to the severity, it may in many cases be preferable to go through a table such as the one below:

| Service Operation i - | Service interval specification for operation i in class Ej - SIO(I, Ej) | | | |
|---|---|---|---|---|
| SO(i) | SIO(i, E1) | SIO(i, E2) | SIO(i, E3) | SIO(i, E4) |
| SO(1) | 35.000 km | 30.000 km | 25.000 km | 25.000 km |
| SO(2) | 45.000 km | 40.000 km | 35.000 km | 30.000 km |
| SO(3) | 6 months | 6 months | 6 months | 4 months |
| . . . | | | | |
| SO(N) | . . . | | | |

The above table defines, for each service operation, a theoretical service interval specification, which is a recommended time/distance/operation interval for performing that service operation, in the theoretical hypothesis that the vehicle would always be operated during that interval within a specific vehicle usage severity.

Based on the table above, it is then possible to determine a mean occurrence point for each service operation as a weighted value comprising the sum of, for each severity class, a mean value corresponding to said severity class weighted according the proportional frequency of presence of said parameter within said severity class. The following formula can be used to:

Mean occurrence point for $SO(i) = \text{SUM}(j=1 \text{ to nmax}) [(Nb(j)/\text{TNB}) * SIO(i, Ej)]$ Where:

nmax=total number of usage severity classes (4 in the case developed above as example), with Enmax being the most severe class and E1 being the least severe class.

Nb(j)=number of days, miles or engine hours spent in a specific usage severity class E(j)

TNB=Total number of days spent over all usage severity classes

SIO(I,Ej)=Service interval specification for operation i in class Ej

One understands that the mean occurrence point hereby defined is indeed correlated to the usage severity distribution.

From there, there are various possible ways to define an earliest and latest occurrence date for the service operation specification. The span between the earliest and latest occurrence points can be called the occurrence window. On way would be to define the occurrence window has having a fixed length, such that earliest and latest occurrence points are located half of that length respectively before and after the mean occurrence point calculated above. A more sophisticated way would be to define a variable length for the occurrence window, depending for example of the vehicle's mean usage severity during the monitoring interval. The earliest and latest occurrence points could then be located at half of that length respectively before and after the mean occurrence point.

In a more sophisticated embodiment of the invention, the earliest and latest occurrence points are calculated asymmetrically with respect to the mean occurrence point as calculated above.

In a preferred embodiment, the determination of earliest occurrence point for a service occurrence specification depends on the frequency of presence of said parameter in the most severe class Enmax (or in a subset of most severe classes). More precisely, it depends on a predefined specification for the most severe class, weighted according to frequency of presence of said parameter in the most severe class (or in the subset of most severe classes), and on the mean occurrence point for that service operation, weighted according to the frequency of presence of said parameter in the other classes.

A formula for calculating the earliest occurrence point for a service occurrence specification can be:

Earliest occurrence point for $SO(i)$=[Mean occurrence point for $SO(i) \times (1-f(En\max))] + SOI(1,En\max) \times f(En\max)$ Similarly, the determination of latest occurrence point for a service occurrence specification depends on the frequency of presence of said parameter in the least severe class E1 (or in a subset of least severe classes). More precisely, it depends on a predefined specification for the least severe class, weighted according to frequency of presence of said parameter in the least severe class (or in a subset of least severe classes), and on the mean value weighted according to the frequency of presence of said parameter in the other classes.

A formula for calculating the latest occurrence point for a service occurrence specification can be:

Latest occurrence point for $SO(i)$=[Mean occurrence point for $SO(i) \times (1-f(E1))] - SOI(I,E1) \times f(E1)$ By using such a process for determining the earliest and latest occurrence points for a service operation, one determines a certain window for said occurrence point. The width of the window is dependent on the usage severity distribution, and more precisely, the more the usage severity shows a big dispersion in its distribution, the wider the window will be. To the contrary, the smaller the dispersion, which corresponds to a more constant vehicle usage severity during the monitoring window, the smaller will be the window width. It is also to be noted that the center of the resulting window, halfway between the earliest and the latest occurrence point, will frequently not be coincident with the mean occurrence point calculated above.

In the end, the occurrence window thereby determined is a time/distance/operating window within which it can be prescribed to perform the service operation for which it has been calculated, taking into account the usage severity of the vehicle during a certain time in the past.

Of course, it could be chosen to apply different calculations methods for the earliest and for the latest occurrence points. For example, the earliest occurrence point can be calculated using an occurrence window having a fixed length, with the earliest occurrence point located half of that length before the mean occurrence point, while the latest occurrence point would be calculated according to the more elaborated formula above.

For each service operation encompassed by the service scheduling, or at least for some of them, the above inventive process can be carried out to determine the corresponding updated occurrence window. For example, in order to minimize the number of service operations for which a recalculation of the service occurrence will need to be performed, it can be provided that the system reviews all the service operations encompassed by the service schedule to determine which of them have exceeded a pre-alert threshold. For example, it can be set that only those service operations which have exceeded 80% of the current service interval, or for which the current service occurrence is scheduled in less than 5000 km should be updated. Other thresholds could be used.

In a further step, the service scheduling process can be programmed to specify when a service stop should occur to perform a series of service operations which are due in the future. Advantageously, this will involve at least grouping some service operations so that they will be performed the same service stop.

First, in order to have homogeneous service occurrence specifications, it is preferable that all the specifications of the series are converted in a common format, for example in a date format. For the specifications expressed in mileage, this will imply knowing or assuming a certain mean vehicle mileage over a given time. For those expressed in operating hours or cycles, it will similarly involve knowing or assuming a certain mean vehicle operation over a given time.

Then, it will be possible to determine a service stop proposition interval maximum date, which can be the first latest occurrence point of the series of service occurrence specifications. Similarly, a minimum date for a service stop proposition interval can be determined as being the last earliest end point of all service occurrence specifications of the series.

If the minimum date is after the maximum date, the service operation to which said last earliest occurrence point pertains is discarded from the series and the calculation of the minimum dates is resumed, until the minimum date is indeed before the maximum date.

The minimum and maximum dates calculated as above determine a service stop proposition interval which can be displayed to a driver or to fleet manager, indicating when the vehicles should preferably be stopped to perform the series of service operations. The information could also or alternatively be sent to a dealer or to a maintenance workshop.

In the case where the updating of service schedule has only been performed for service operations which have exceeded a pre-alert threshold, it could be provided in a further step that the schedule updating process be also performed for other service operations, to check whether the corresponding service operations could also be performed within the same service stop proposition interval as defined above. Although the updating could be performed for all remaining service operations encompassed by the service scheduling, it may be preferable to select only some operations. For example, this supplementary updating can be limited to service operations for which it can be expected that the pre-alert threshold will be exceed in the near future, for example within the next month. This of course involves making a prediction on the vehicle's mileage or time of operation within the near future. After an updated service occurrence window has been determined for these supplementary service operations, it is then determined which of these service occurrence windows overlap the service stop proposition interval.

FIG. 1 shows schematically one possible embodiment of a system for implementing the invention.

A truck 1 is provided with an onboard electronic control device 2 which comprises a main electronic control unit or ECU 21 and which is connected to the vehicle electronic architecture, for example through a CAN bus. The electronic control device 2 is charge of monitoring the vehicle parameter(s) for determining the vehicle usage severity. It can be a dedicated ECU or it can be a part of an existing ECU performing also other tasks. Device 2 also includes a communication module 25 connected to ECU 21 and adapted to exchange data with a remote server 3, for example embodied as a personal computer 3. For instance, module 25 can send a radio signal S1 to computer 3 and receive another radio signal S2 coming from this computer. The radio signal can for example go through a standard telephone network with wireless capability, for example using GSM or GPRS standards and/or through internet protocol. Communication between module 25 and server 3 could also be made via satellite, or via an electric wire plugged into module 25 when truck 1 reaches a maintenance facility including server 3. Communication between device 2 and computer 3 can also occur via an USB stick which can be loaded with data to be transferred from device 2 to computer 3 and vice versa.

The server 3 may include a central unit 31, a screen 32, a keyboard 33 and a mouse 34, and it may be adapted to communicate with other computers 41, 42, 43 and 44 connected by a local network 45 or through the internet. The server 3 includes or has access to the scheduling means which are able to create, store and update a service stop schedule for one vehicle of for a series of vehicles. The scheduling means comprise computer software and databases adapted to perform a scheduling process, including the updating process according to the invention.

Figure 2:
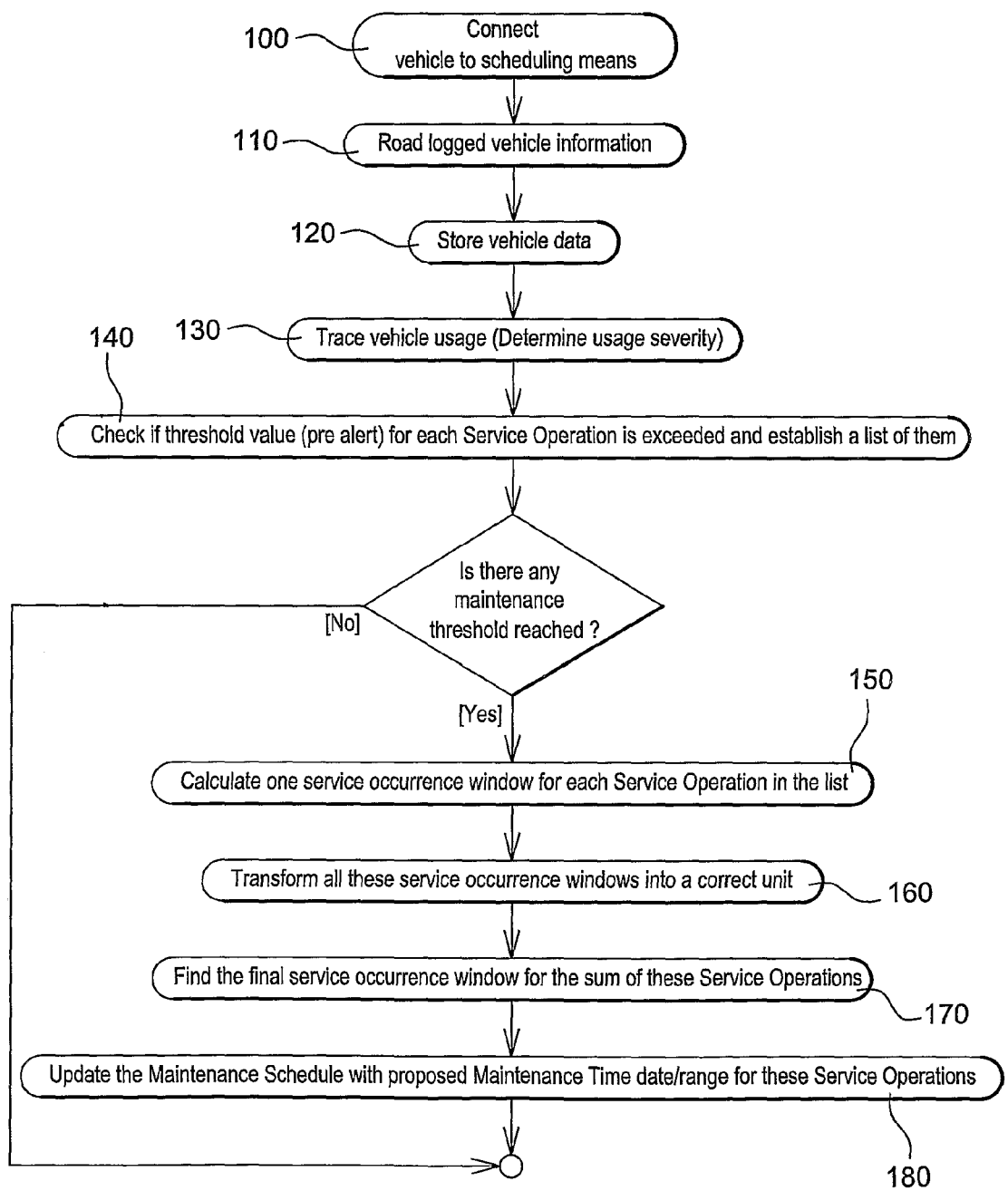
FIG. 2 is a flow diagram representing some the steps of a service scheduling process including the inventive process

FIG. 2 shows an exemplary workflow-diagram of the operation of the process by the scheduling means. This process can be carried out daily, or less frequently, for example each week.

Once a communication session is established at step 100 between the vehicle 1 and the scheduling means located in the server 3, the latter reads at step 110 the information which has been gathered by the monitoring means in the vehicle 3, including onboard electronic control device 2, during the monitoring interval between last communication session and present. This information may for example comprise:
vehicle identification;
vehicle operation in terms of mileage and/or engine hours;
fuel consumption.

At step 120, this information is stored on the server 3, together with the current calendar date and with the mean fuel consumption rate as calculated from the retrieved fuel consumption and vehicle mileage. At step 130, the scheduling means can, using the calculated fuel consumption rate, classify the vehicle usage during the corresponding period into one usage severity class. The vehicle usage distribution history can therefore be updated with this information.

At step 140, it is investigated which service operations have exceeded a pre-alert threshold. Step 140 establishes a list of service operations for which an update of the service scheduling will be performed. Of course, it could be provided that this step is not used and that all service operations specifications are updated at each time the system receives a set of information from the vehicle.

At step 150, an updated service occurrence window, comprising the earliest and latest occurrence points for each service operation, will be calculated as described above, taking into account the vehicle usage severity distribution during the monitoring period, which in this case is a sliding period of 1 year till present.

At step 160, all the service occurrence windows are expressed in a common unit, for example in calendar days.

At step 170, all the service occurrence windows are summed to determine a service stop proposition interval as described above, and an updated service schedule, including all those operations for which a service are to be preformed within the next stop is stored at step 180.

Figure 3:
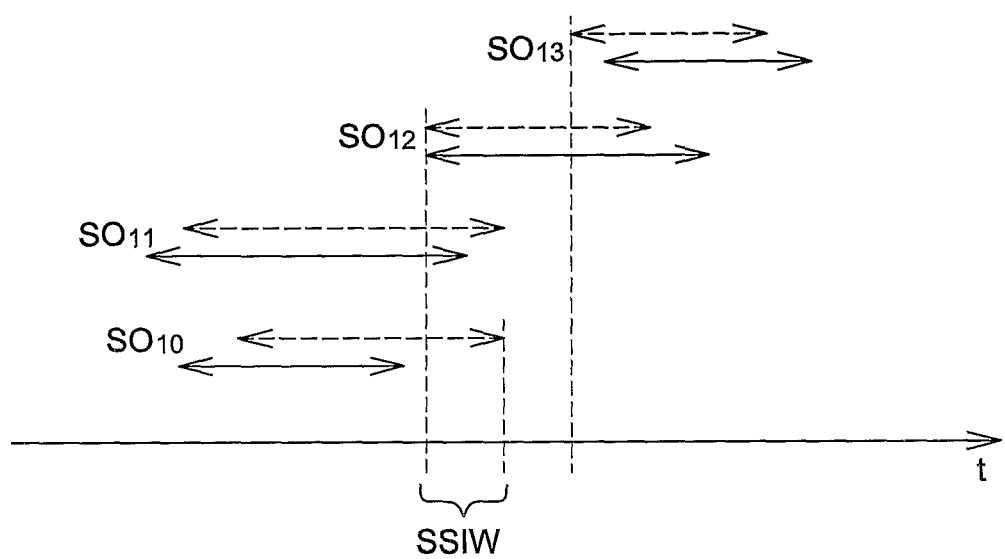
FIG. 3 is an illustration related to of one step of a service scheduling process.

Step 170 is illustrated on FIG. 3 where it is represented, on a time scale, the service occurrence windows for 4 operations S010-S013. In solid lines, it is represented the service occurrence window before the updating process, and in dashed lines after the updating process. The service stop interval window SSIW is determined as described above, and, in this example, service operation S013 is to be discarded, leaving only 3 service operations S010, S011 and S011 to be performed at the next service stop as proposed.

From there, various options are possible, such as sending a service alert to the driver or to the fleet manager as to when the next service stop should be programmed and which operations are to be performed.

Thanks to the invention, it therefore possible to optimize the service scheduling of a vehicle by optimizing the interval of time between two service operations. For service operations implying the replacement of a part, this shall ensure a more complete use of the part before it is replaced preventively, while not increasing dramatically the risk of failure of the part. This will result in an increase of the effective life time of the corresponding part, i.e. the time between its installations of the vehicle and its dismounting from the vehicle. Indeed, since vehicle usage is taken into account, it will not be necessary, as it is with conventional preventive service scheduling, to have very conservative figures with respect to the expected lifetime of the part to achieve a high level of reliability. Similarly, when it comes to service operations involving only the checking of a component, the process according to the invention will allow to limit those checks only to the extent necessary, tracking at best the real degradation of the component with respect to the effective usage of the vehicle. This is very important for some intrusive checking operation where the checking operation in itself may be a source of future malfunction of the vehicle. Therefore, the overall cost for operating the vehicle can be reduced thanks to the use of the process according to the invention.

The invention claimed is:

1. A system for updating scheduling of a service stop for a machine, comprising
an electronic control device on the machine for monitoring, over a monitoring interval, a usage severity of the machine by monitoring at least one machine parameter,
a remote server, and communication means for transferring data from the electronic control device to the remote server, wherein the remote server is configured for:
receiving information which has been gathered by the electronic control device,
determining, for at least one service operation, a service occurrence specification, and
determining a window for an occurrence point for the service operation, a width of the window being dependent on a distribution of the usage severity,
wherein the server is configured for establishing a value distribution for the parameter during the monitoring interval, establishment of the value distribution comprising determining a plurality of severity classes, and determining a proportional frequency of presence of the parameter within each severity class.

2. The system according to claim 1, wherein the server is configured for determining and setting an earliest occurrence point and a latest occurrence point for the service occurrence specification, and wherein the determination of the earliest and the latest occurrence point for a service occurrence specification includes calculating a mean occurrence point as a weighted value comprising a sum of, for each severity class, a theoretical specification corresponding to the severity class weighted according a proportional frequency of presence of the parameter within the severity class.

3. The system according to claim 1, wherein the server is further configured for determining an earliest occurrence point for a service occurrence specification as a function of a frequency of presence of the parameter in a most severe class of the severity classes.

4. The system according to claim 1, wherein the server is further configured for determining an earliest occurrence point for a service occurrence specification as a function of a frequency of presence of the parameter in a most severe class of the severity classes, and determining the earliest occurrence point for a service occurrence specification based on a predefined specification for the most severe class, weighted according to frequency of presence of the parameter in the most severe class, and on a mean value weighted according to frequency of presence of the parameter in other ones of the classes.

5. The system according to claim 1, wherein the server is further configured for determining a latest occurrence point for a service occurrence specification as a function of a frequency of presence of the parameter in the least severe class of the severity classes, or in a subset of least severe classes.

6. The system according to 1, wherein the server is further configured for determining a latest occurrence point for a service occurrence specification depending on a predefined specification for the least severe class, weighted according to frequency of presence of the parameter in the least severe class.

7. The system according to claim 1, wherein the server is further configured for determining a latest occurrence point for a service occurrence specification based on a predefined specification for the least severe class, weighted according to frequency of presence of the parameter in the least severe class, and comprising determining the latest occurrence point for a service occurrence specification as a function of a predefined specification for the least severe class, weighted according to frequency of presence of the parameter in the least severe class, and as a function of a mean value weighted according to frequency of presence of the parameter in the other classes.

8. A system for updating scheduling of a service stop for a machine, comprising an electronic control device on the machine for monitoring, over a monitoring interval, a usage severity of the machine by monitoring at least one machine parameter,
a remote server, and
communication means for transferring data from the electronic control device to the remote server,
wherein the remote server comprises a computer programmed for
receiving information which has been gathered by the electronic control device
determining, for at least one service operation, a service occurrence specification,
establishing a value distribution for the at least one parameter during the monitoring interval by determining a plurality of severity classes, each severity class being defined by a range of values for the at least one parameter, and by determining a proportional frequency of presence of the parameter within each severity class, and
determining a mean occurrence point for each service operation as a weighted value comprising a sum of, for each severity class, a mean value corresponding to the severity class weighted according a proportional frequency of presence of the parameter within the severity class.

9. The system according to claim 8, wherein the computer is further configured for determining and setting an earliest occurrence point and a latest occurrence point for the service occurrence specification, the earliest occurrence point and the latest occurrence point being determined such that an occurrence window between the earliest and latest occurrence points is fixed.

10. The system according to claim 8, wherein the computer is further configured for determining and setting an earliest occurrence point and a latest occurrence point for the service occurrence specification, the earliest occurrence point and the latest occurrence point being determined such that an occurrence window between the earliest and latest occurrence points is variable, depending on a mean usage severity of the vehicle during the monitoring interval.

11. The system according to claim 10, wherein the computer is further configured for determining the earliest occurrence point for a service occurrence specification as a function of a frequency of presence of the parameter in a most severe class of the severity classes.

12. The system according to claim 11, wherein the computer is further configured for determining the earliest occurrence point for a service occurrence specification as a function of a frequency of presence of the parameter in a most severe class of the severity classes, and determining the earliest occurrence point for a service occurrence specification based on a predefined specification for the most severe class, weighted according to frequency of presence of the parameter in the most severe class, and on a mean value weighted according to frequency of presence of the parameter in other ones of the classes.

13. The system according to claim 10, wherein the computer is further configured for determining the latest occurrence point for a service occurrence specification as a function of a frequency of presence of the parameter in the least severe class of the severity classes, or in a subset of least severe classes.

14. The system according to 10, wherein the computer is further configured for determining the latest occurrence point for a service occurrence specification depending on a predefined specification for the least severe class, weighted according to frequency of presence of the parameter in the least severe class.

15. The system according to claim 14, wherein the computer is further configured for determining the latest occurrence point for a service occurrence specification based on a predefined specification for the least severe class, weighted according to frequency of presence of the parameter in the least severe class, and comprising determining the latest occurrence point for a service occurrence specification as a function of a predefined specification for the least severe class, weighted according to frequency of presence of the parameter in the least severe class, and as a function of a mean value weighted according to frequency of presence of the parameter in the other classes.

16. The system according. to claim 8, wherein the mean value corresponding to the severity class comprises a theoretical service interval specification, the theoretical service interval specification being at least one of a recommended time, distance, and operation interval for performing the service operation based on a hypothesis that the vehicle will always be operated during a theoretical service interval within the severity class.

17. A system for updating scheduling of a service stop for a machine, comprising
    an electronic control device on the machine for monitoring, over a monitoring interval, a usage severity of the machine by monitoring at least one machine parameter,
    a remote server, and
    communication means for transferring data from the electronic control device to the remote server,
    wherein the remote server is configured for
    receiving information which has been gathered by the electronic control device,
    determining, for at least one service operation, a service occurrence specification,
    setting an earliest occurrence point and a latest occurrence point for the service occurrence specification which are determined according to the machine usage severity monitored during the monitoring interval, and
    establishing a value distribution for the parameter during the monitoring interval, which comprises determining a number of severity classes, and determining a proportional frequency of presence of the parameter within each severity class,
    wherein the step of setting the earliest and latest occurrence points takes into account the distribution of usage severity during the monitoring interval.

18. The system according to claim 17, wherein the computer is further configured for determining the earliest occurrence point for a service occurrence specification as a function of a frequency of presence of the parameter in a most severe class of the severity classes.

19. The system according to claim 17, wherein the computer is further configured for determining the latest occurrence point for a service occurrence specification as a function of a frequency of presence of the parameter in the least severe class of the severity classes, or in a subset of least severe classes.

* * * * *